US012582103B1

(12) United States Patent
Habetz

(10) Patent No.: US 12,582,103 B1
(45) Date of Patent: Mar. 24, 2026

(54) AQUATIC ORGANISM ACCLIMATION SYSTEM

(71) Applicant: Scott Habetz, Lake Charles, LA (US)

(72) Inventor: Scott Habetz, Lake Charles, LA (US)

( * ) Notice: Subject to any disclaimer, the term of this patent is extended or adjusted under 35 U.S.C. 154(b) by 128 days.

(21) Appl. No.: 18/648,739

(22) Filed: Apr. 29, 2024

(51) Int. Cl.
*A01K 63/04* (2006.01)

(52) U.S. Cl.
CPC .................................. *A01K 63/042* (2013.01)

(58) Field of Classification Search
CPC ............................ A01K 63/042; A01K 63/047
See application file for complete search history.

(56) References Cited

U.S. PATENT DOCUMENTS

| | | | |
|---|---|---|---|
| 4,188,909 A | 2/1980 | Spivak | |
| 5,860,393 A | 1/1999 | Calabrese, Jr. | |
| 6,640,749 B1 | 11/2003 | Monnier | |
| 7,681,530 B2 | 3/2010 | Perry | |
| 9,125,383 B1 * | 9/2015 | Yim ....................... | A01K 61/10 |
| 2002/0185080 A1 | 12/2002 | Ortiz | |
| 2007/0227459 A1 | 10/2007 | Gould | |
| 2009/0139457 A1 | 6/2009 | Luong | |
| 2012/0055413 A1 | 3/2012 | Kim | |
| 2012/0067797 A1 * | 3/2012 | Kaw .................... | A01K 63/042 |
| | | | 210/150 |
| 2013/0009469 A1 * | 1/2013 | Gillett ..................... | H02J 3/381 |
| | | | 307/25 |
| 2014/0019060 A1 | 1/2014 | Clark | |
| 2017/0135324 A1 * | 5/2017 | Calabrese ................ | C02F 1/283 |
| 2018/0156189 A1 * | 6/2018 | Kohsaka ............... | B64C 25/001 |

FOREIGN PATENT DOCUMENTS

JP 2023070394 5/2023

OTHER PUBLICATIONS

Aqueon, How to Acclimate your Fish—Drip Acclimation, , Sep. 22, 2020, Youtube.com, USA, https://www.youtube.com/watch?v=8vBXJqC6cQ4, Youtube—How to Acclimate Your Fish.pdf.
HisArmCo, Acclimate Instructions—Reef Gently, 41032, Youtube.com, USA, https://www.youtube.com/watch?v=hpw09nKaCZo, Youtube AccliMate Instructions.pdf, (published May 3, 2012).

(Continued)

*Primary Examiner* — Monica L Perry
(74) *Attorney, Agent, or Firm* — Matthew Compton

(57) ABSTRACT

Apparatuses and methods for acclimatizing aquatic organisms in an aquarium environment. In one embodiment, an acclimatizer has at least one but preferably two water pump heads, each pump head having a suction and discharge hose. The acclimatizer has a hanger with one or more hose guides that help secure suction hoses during use. A pump motor controller for each pump controls the rate of discharge for that pump, or in some embodiments, all pumps. In some embodiments, a dual-head pump is used. One or more aeration pumps, each with a corresponding hose, assist with aerating water. Acclimation water from an aquarium may be suctioned and discharged at a certain rate into an acclimation container with source water therein while the source water is being aerated by an aeration pump. The acclimation container may be in physical contact with aquarium water. Clips may secure the acclimation container to the aquarium wall.

12 Claims, 13 Drawing Sheets

(56)                    References Cited

OTHER PUBLICATIONS

Aquaristik-innovation.com, Reef Gently AcclimateTM Standard, aquaristik-innovation.com, USA, https://www.aquaristik-innovation. com/product-page/reef-gently-acclimate-standard, Reef Gently AccliMate Standard.pdf, (published 2017).

Reddit, r/PlantedTank, How do you Drip Acclimate new fish & what Equipment do you use?, Reddit.com, USA, https://www.reddit.com/ r/PlantedTank/comments/vs5q15/how_do_you_drip_acclimate_new_ fish_what_equipment/, Reddit—Drip Acclimation.pdf, (published 2022).

Vivid Aquarieums, Red Sea Reefdose 4—Dosing pump, Vividaquariums.com, USA, https://vividaquariums.com/products/ red-sea-reef-dose-4?variant=40671456755797, Red Sea ReefDose— Dosing Pump.pdf, (published 2023).

Doradon, FA18X Aquarium Acclimation System, Amazon.com, USA, https://www.amazon.com/gp/product/B005YIVJSU, Amazon— Doradon FA18X.pdf, (published Oct. 23, 2011).

K Kamoer, Low flow peristaltic pump 12V DC, Amazon.com, USA, https://www.amazon.com/gp/product/B07GWJ78FN/, Mar. 8, 2024 Peristaltic Pump.pdf.

RioRand, RioRand RR-PWM-15V, Amazon.com, USA, https:// www.amazon.com/gp/product/B00N30UK2M, Mar. 8, 2024 Peristaltic Pump Motor Controller.pdf.

K Kamoer, Micro dual-channel peristaltic pump 24V, Amazon.com, USA, https://www.amazon.com/gp/product/B0BFQW56GB, Mar. 8, 2024 Dual Head Stepper Peristaltic Pump.pdf.

K Kamoer, Kamoer 4460.5 Stepper Motor Control, Amazon.com, USA, https://www.amazon.com/gp/product/B0BXC6QFJT, Mar. 8, 2024 Dual Head Stepper Peristaltic Pump Driver.pdf.

Dafurui, Dafurui 10 Pack LM2596 DC-DC Adjustable Buck Converter, Amazon.com, USA, https://www.amazon.com/gp/product/ B08CGL6FQD, Mar. 8, 2024 Buck Converter.pdf.

Pen, DC 3V 12A Mini Air Pump Motor, Amazon.com, USA, https://www.amazon.com/gp/product/B08MD68BTD, Mar. 8, 2024 Aeration Pump.pdf.

* cited by examiner

AQUATIC ORGANISM ACCLIMATION SYSTEM

FIELD OF THE INVENTION

The present invention generally relates to the field of apparatuses and methods for acclimatizing aquatic organisms in an aquarium environment.

BACKGROUND OF THE INVENTION

In keeping aquatic organisms such as fish, crustaceans, coral, plants, invertebrates, and various other aquatic species in artificial or non-native environments, one of the key aspects to long term success is beginning with a healthy specimen. The health of an aquatic organism is most stressed during transport, with the last stage of transport being the introduction into the new environment. The new environment's water will have different parameters than the organism's source water, and also different parameters from the shipping media.

Acclimation of aquatic organisms from the source and shipping media to the new environment is the most critical stage of transport, as it occurs when the specimen is most stressed. Successful acclimation sets the organism up for long term success, and an unsuccessful acclimation can kill the organism immediately, or over several hours, days, or even months. The aquatic organism acclimation problem has been unsolved for more than 100 years, with a substantial percentage (30-75%) of transported fish dying every year due to acclimation stress. Accordingly, there is long-felt need for improved methods and apparatuses to safely acclimate aquatic organisms into a new environment.

SUMMARY OF THE INVENTION

In one embodiment of the present invention, an aquatic organism acclimation apparatus comprises a housing, a hanger connected to the housing, a first water pump connected to the housing, a second water pump connected to the housing, a first motor speed controller to control the flow rate for the first water pump, the first motor speed controller connected to the housing, and a second motor speed controller to control the flow rate for the second water pump, the second motor speed controller connected to the housing. In some embodiments, the hanger comprises exactly one tube guide opening for a tube to pass through, but in some embodiments, the hanger comprises at least two tube guide openings, each opening for a tube to pass through. In some embodiments, the hanger is L-shaped, and in some embodiments, the hanger is ∩-shaped. In some embodiments, there is also exactly one air pump inside the housing, but in other embodiments, there are at least two air pumps inside the housing.

In another embodiment, an aquatic organism acclimation apparatus comprises a housing, a hanger connected to the housing, a first dual-head water pump connected to the housing, a second dual-head water pump connected to the housing, a first motor speed controller to control the flow rate for the first dual-head water pump, the first motor speed controller connected to the housing, and a second motor speed controller to control the flow rate for the second dual-head water pump, the second motor speed controller connected to the housing. In some embodiments, the hanger comprises exactly one tube guide opening for a tube to pass through, but in some embodiments, the hanger comprises at least two tube guide openings, each opening for a tube to pass through. In some embodiments, the hanger is L-shaped, and in some embodiments, the hanger is ∩-shaped. In some embodiments, there is also exactly one air pump inside the housing, but in other embodiments, there are at least two air pumps inside the housing.

In another embodiment, an aquatic organism acclimation apparatus comprises a housing, a hanger connected to the housing, a water pump connected to the housing, and a first motor speed controller to control the flow rate for the water pump, the first motor speed controller connected to the housing. In some embodiments, the hanger comprises exactly one tube guide opening for a tube to pass through, but in some embodiments, the hanger comprises at least two tube guide openings, each opening for a tube to pass through. In some embodiments, the hanger is L-shaped, and in some embodiments, the hanger is ∩-shaped. In some embodiments, there is also exactly one air pump inside the housing, but in other embodiments, there are at least two air pumps inside the housing. In some embodiments, the hanger is integrally connected with the housing. In some embodiments, the water pump is a dual-head pump.

In another embodiment of the present invention, an aquatic organism acclimation apparatus comprises a housing, a first water pump connected to the housing, a second water pump connected to the housing, a first motor speed controller to control the flow rate for the first water pump, and a second motor speed controller to control the flow rate for the second water pump. In some embodiments, there is also exactly one air pump inside the housing, but in other embodiments, there are at least two air pumps inside the housing. In some embodiments, a hanger is not present, but in other embodiments, a hanger connected to the housing is present.

DETAILED DESCRIPTION

Figure 1:
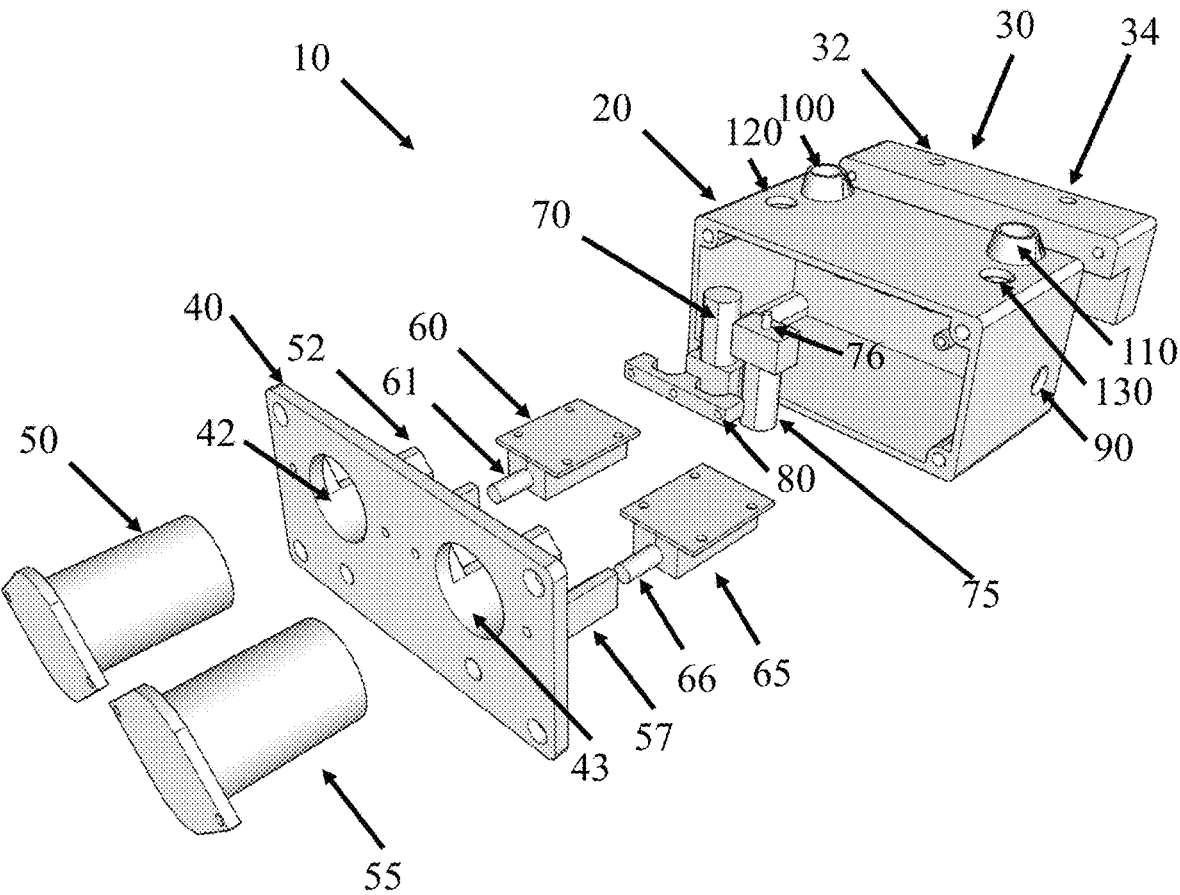
FIG. 1 depicts an exploded view of components of an embodiment of an aquatic acclimation device.

The present invention is described with reference to the attached figures. The figures are not drawn to scale. Several aspects of embodiments of the invention are described below. It should be understood that numerous specific details, relationships, and methods are set forth to provide an understanding of the invention. One skilled in the relevant art, however, will readily recognize that the invention can be practiced without one or more of the specific details or with other methods.

Acclimation of a transported aquatic organism to a new environment includes equalizing the shipping media or source parameters (referred to the "source parameters") with the parameters of the new environment's media (referred to as the "new parameters"). While the media is typically water, in reality the "water" in an aquatic environment is not pure water and has many other things dissolved or suspended or contained in it, and so the more general term media is sometimes used herein. Uses of the term "water" are generally meant to include the water and those things dissolved or suspended or contained in it unless specifically stated otherwise.

The major parameters of interest for water in the acclimation of aquatic organisms include pH, temperature, and salinity. Other parameters may include ammonia concentration, hardness, turbidity, dissolved solids and other salts, type and/or quantity of bacteria (or other small or microscopic organisms such as algae and plankton), concentrations of dissolved gases (e.g., oxygen, nitrogen, carbon dioxide), nitrites, and the presence and/or amount of trace elements or chemicals. The are many other water parameters, the importance of which may vary based upon the aquatic organism(s) at issue.

The traditional method of acclimating aquatic organisms is to float the container, usually a plastic bag, in which the marine inhabitant was transported (a shipping bag), in the new environment's water (e.g., in an aquarium) for a period of time, such as thirty minutes. Due to thermal transmission through the walls of the container, the temperature of the water shipping bag will normalize with the water in the aquarium. The shipping bag is then opened and the organism is allowed to swim out or is removed from the shipping bag and placed into the aquarium. Alternatively, the shipping bag is opened and new media would be added to the source media either manually or via gravity syphon. Both methods are deficient due to temperature instability and/or inconsistent addition of new media. Thus the above procedures are high-risk methods that often leads to the death of the organism.

An ideal acclimation method is one that will gradually replace the source media with the new media, over an extended period of time, focusing on all (or as many as desired or those reasonably possible) parameters in unison. Standard acclimation methods are limited by volume, time, and/or parameters that can be acclimated in unison. A slower acclimation time is typically preferred over rapid acclimation, but this may vary based on the aquatic organism(s) at issue. Ammonia buildup and temperature variations may also represent significant limiting factors with respect to extended acclimation periods.

In some instances, time for acclimation is limited due to the conditions that exist within the water in the shipping bag. Once the shipping bag is opened, a non-toxic form of ammonia that had built up in transit within the shipping water due to the respiration of the organism(s) and their waste becomes toxic. As the $CO_2$ in the shipping water drops, the pH of the shipping water increases which causes a transition of the non-toxic form of ammonia into a form of ammonia toxic to the acclimating organism.

This ammonia transition limits the time for acclimation in many cases. Using an ammonia reducer that renders toxic ammonia safe for aquatic organisms can be used to neutralize the ammonia in the opened shipping container. But in neutralizing the ammonia, the ammonia reducing agent depletes the oxygen levels in the shipping water. It should be noted that in the case of copper medications present in the source water, an ammonia reducing agent should typically not be used as it might create toxic conditions for the acclimating organism.

An object of one embodiment of the present invention is to acclimate an aquatic organism while focusing on multiple parameters simultaneously, and to do so via drip acclimation not reliant upon gravity as a means of fluid transfer. Not relying upon gravity allows for the aquatic organism's acclimation container to be in contact (and thus transfer heat) with the water in the new environment during the acclimation process. This contact facilitates temperature normalization whereby the water in the acclimation container is cooled/warmed to the water temperature of the new environment.

After an initial temperature acclimation, the source of the water used for acclimation, the container used for acclimation, and the new environment for which acclimation is being performed are ideally all at approximately the same temperature throughout the remainder of the acclimation process. Less preferrable acclimation methods may include periods of time where the acclimation container is not in contact with the water in the new environment, and thus will likely experience temperature fluctuations that are not conducive to a stable acclimation protocol.

In one preferred embodiment, an aquatic acclimation device preferably uses peristaltic pumps to add water from the new environment to the source water at an adjustable rate. This method of drip acclimation is more controlled, stable, and steady than gravity fed siphons or manual water addition, or any method in which temperature acclimation cannot be performed and the temperature held steady at the same time as other parameters are adjusted. The small effect the water addition itself has on the temperature of the source water is minimal, especially when acclimation occurs slowly thus the advantage of keeping the acclimation container in contact with the new environment for temperature stability. The ability to control the flow rate of the pump(s) allows for dialing in desired acclimation rate based on species and water volume.

Dual head, or multiple pumps can also be used to remove water from the acclimation container (sending it to a waste container) as the primary pump is adding water from the new environment to the acclimation container. In this way, slower acclimation can be performed, with no fear of overflowing the acclimation container. And, simultaneously adding water from the new environment to the acclimation container at the same rate as the water in the acclimation container is removed results in using less of the new environment's water. This is because each drop of the new environment's water will carry the essentially same acclimation potential since the water volume in the acclimation container will remain approximately constant.

This contrasts to prior art methods where each drop of the new environment's water has less and less acclimation potential as the volume of the acclimation container increases over time. Also, in gravity based prior art methods of drip acclimation, the drip rate may start low but typically is increased with time to compensate for increasing volume in the acclimation container. This results in consumption of more of the new environment's water.

To avoid toxic ammonia or a low oxygen acclimation environment, the aquatic acclimation device described herein allows for the safe use of an ammonia neutralizing agent in the acclimation container with the source water (barring any use of copper medications). Optional integral aeration pumps feed air through a hose or tube to an air stone placed within the acclimation container to keep the water oxygenated and prevent a low-oxygen environment, particularly when an ammonia neutralizer is used.

(Generally speaking, in the aquarium context, a tube is an elongated flexible pipe-like structure, typically made of materials such as flexible plastic, rubber, polyurethane, polyvinyl chloride, silicone, or other like materials. A hose is typically a tube that is reinforced with additional materials so as to support higher pressures. For purposes of this discussion, a tube and hose are functionally interchangeable and used interchangeably herein, and the actual use of one over the other in practice is a matter of preference or as required for a specific application.) The aquatic acclimation device allows for the slow, methodical, and stable acclimation of all aquatic species for introduction into their new environment, and may be used with fresh, marine, or brackish waters. Specimens acclimated to new environments in a speedy manner to avoid some known impending issue will never fair as well as a specimen that was acclimated with a stable rate of change over an extended period of time, with stability of said parameters once they are attained.

FIG. 1 depicts an exploded view of components of an embodiment of an aquatic acclimation device 10. A housing 20 connects with (or in some embodiments is integral with) a L-shaped hanger 30. The L-shaped hanger 30 has a first suction hose guide 32 and a second suction hose guide 34. The tube or hose guides 32 and 34 are openings that extend through the leg of the hanger and allow a hose to be passed through. These hose guides 32 and 34 are typically used with a pump suction hose, the guides keeping the hose securely in the water during the acclimation process. The leg of the hanger 30 allows the aquatic acclimation device 10 to rest safely on the edge of an aquarium tank. In some embodiments, the tube or hose guides 32 and 34 open on the top of the hanger 30 and pass through to the bottom of the leg. In other embodiments, the tube or hose guides 32 and 34 open on the top of the hanger 30 and curve so as to exit the back of the hanger 30. In some embodiments, three, four, five, or more tube or hose guide openings may be present, particularly when multiple acclimation containers are being treated simultaneously. A hanger is not present in some embodiments, for example, when the housing rests on a floor or a shelf or a table a hanger is not needed. In some embodiments, the hanger is ∩-shaped with one side of the n being connected to, or integral with, the housing.

The housing 20 has a first air pump 70 and a second air pump 75 therein. An air pump housing bracket 80 secures the air pumps 70 and 75 to the housing. The air pumps 70 and 75 have nipples (e.g., second air pump nipple 76) that connect to flexible rubber or plastic air hoses (not shown). The power to the first air pump 70 is controlled by a switch (not shown) mounted in switch mounting hole 120. The power to the second air pump 75 is controlled by a switch (not shown) mounted in switch mounting hole 130. In some embodiments, a single switch may control both the first and second air pumps 70 and 75. In some embodiments, each air pump switch controls both the on/off state of the pump as well as the air pumping rate. In some embodiments, each air pump has their own motor controller that controls the rate of pumped air.

The embodiment of FIG. 1 has a first nipple protecting bulkhead 100 which protects a nipple (not shown) that spans an opening in the wall of the housing 20. The first air pump 70's nipple (not shown) connects to a hose (not shown) that connects to a two-sided nipple (not shown) that spans the wall of the housing 20. The first nipple protecting bulkhead 100 helps protect the exterior portion of the nipple from accidental contact that may break the nipple. A second hose connects to the nipple in the bulkhead which later connects to an air stone. As such, the nipple protected by the first nipple protecting bulkhead acts as connecting interface to allow air to pass through the wall of the housing 20. A second nipple protecting bulkhead 110 operates similarly with respect to the second air pump 75. In some embodiments, a bulkhead 100/110 need not be present, and the hose from an air pump to an air stone may pass directly through the wall of the housing via openings. In some embodiments, unprotected nipple connections may be present. In some embodiments, compression fittings may be used to secure the hose in the opening.

The air pumps 70 and 75 are used as optional aeration pumps to feed air through a hose to an air stone placed within an acclimation container to keep the water oxygenated. This is most often done when an ammonia neutralizer is used. In some embodiments only a single air pump is present. In some embodiments, three, four, or five air pumps may be present.

The housing also comprises a first pump motor speed controller 60 for the first pump 50 and a second pump motor speed controller 65 for the second pump 55. In some embodiments, only a single pump motor controller is used to set the flow rate for both the first 50 and second 55 pumps. In a preferred embodiment, the first pump 50 and second pump 55 are each a dual-head peristaltic pump. Two dual-head peristaltic pumps enable the aquatic acclimation device 10 to simultaneously acclimate two different acclimation containers while maintaining the volume of both acclimation containers approximately constant (as further discussed below). In combination with the two air pumps 70 and 75, the aquatic acclimation device can also aerate two acclimation containers.

In some embodiments, only a single pump is present. In some embodiments, only a single dual-head pump is present. In some embodiments, three or four or five pumps are present. In some embodiments, three or four or five dual-head pumps are present. The preferred size of the aquatic acclimation device, the size of the aquarium or tank to house the organisms, the number of acclimation containers to be simultaneously acclimated, and/or the desired method of acclimation will influence the ideal number and type of pumps of the aquatic acclimation device.

An opening 90 for a power cord allows, for example, alternating current ("AC") (e.g., from a 120-volt wall outlet) in conjunction with an external AC to DC (direct current) power converter (not shown) to supply 12V DC to the apparatus. In some embodiments, 5V, 12V, or 24V DC or other appropriate electrical power may be directly supplied to the apparatus. In some embodiments, incoming voltage may be reduced via a buck converter inside the housing (not shown), stepped up with a boost converter, or be both stepped up and reduced for different devices (e.g., pumps, controllers) as needed via a buck-boost converter. In some embodiments, power to the apparatus may be converted via an AC-AC, AC-DC, DC-DC, or DC-AC converter inside or outside the housing 20 to supply the appropriate type of electrical power at the appropriate voltage to the various powered components.

In one embodiment, at external AC to DC power converter provides power through a power cord to the apparatus at an appropriate DC voltage and amperage (e.g. 12V, 10 amps) for the air pumps 70 and 75, and the pump motor speed controllers 60 and 65 which control the water pumps 50 and 55. In some embodiments, the power converter or power source may be external to the device, with DC power of the appropriate voltage and amperage being supplied via a wire through the opening 90 to power the air pumps 70 and 75 and the pump motor speed controllers 60 and 65 for the water pumps 50 and 55. In some embodiments, batteries inside or external to the housing may be used as a power source.

In some embodiments, the motor speed controllers may be integral to the pumps and power is supplied directly to the pumps. A main switch hole (not shown) may be located on the top of the housing in between the switches for the air pumps to control power to the entire device 10. The first and second motor speed controllers 60 and 65 respectively may be used to control the speed of their respective water pumps 50 and 55. As shown in FIG. 1, the first and second pump motor speed controllers 60 and 65 each have a rotatable shaft that a user may rotate to set the speed of the pump. In some embodiments, the motor speed controllers 60 and 65 can also be used to turn the pump on/off and also to set the pumping rate.

A housing faceplate 40 is, in the embodiment of FIG. 1, connected to and removable from the housing 20. The faceplate 40 has openings 42 and 43 to allow the first and second pumps 50 and 55 respectively to pass through the faceplate. The faceplate 40 also has a first 52 and second 57 pump support which provides internal structural support for the pumps 50 and 55 and also mounting locations for the first 60 and second 65 pump motor speed controllers. (In some embodiments, the faceplate is integral with the housing and a bottom plate or side plate or top plate is used to access and install the housing's interior components.)

Figure 2:
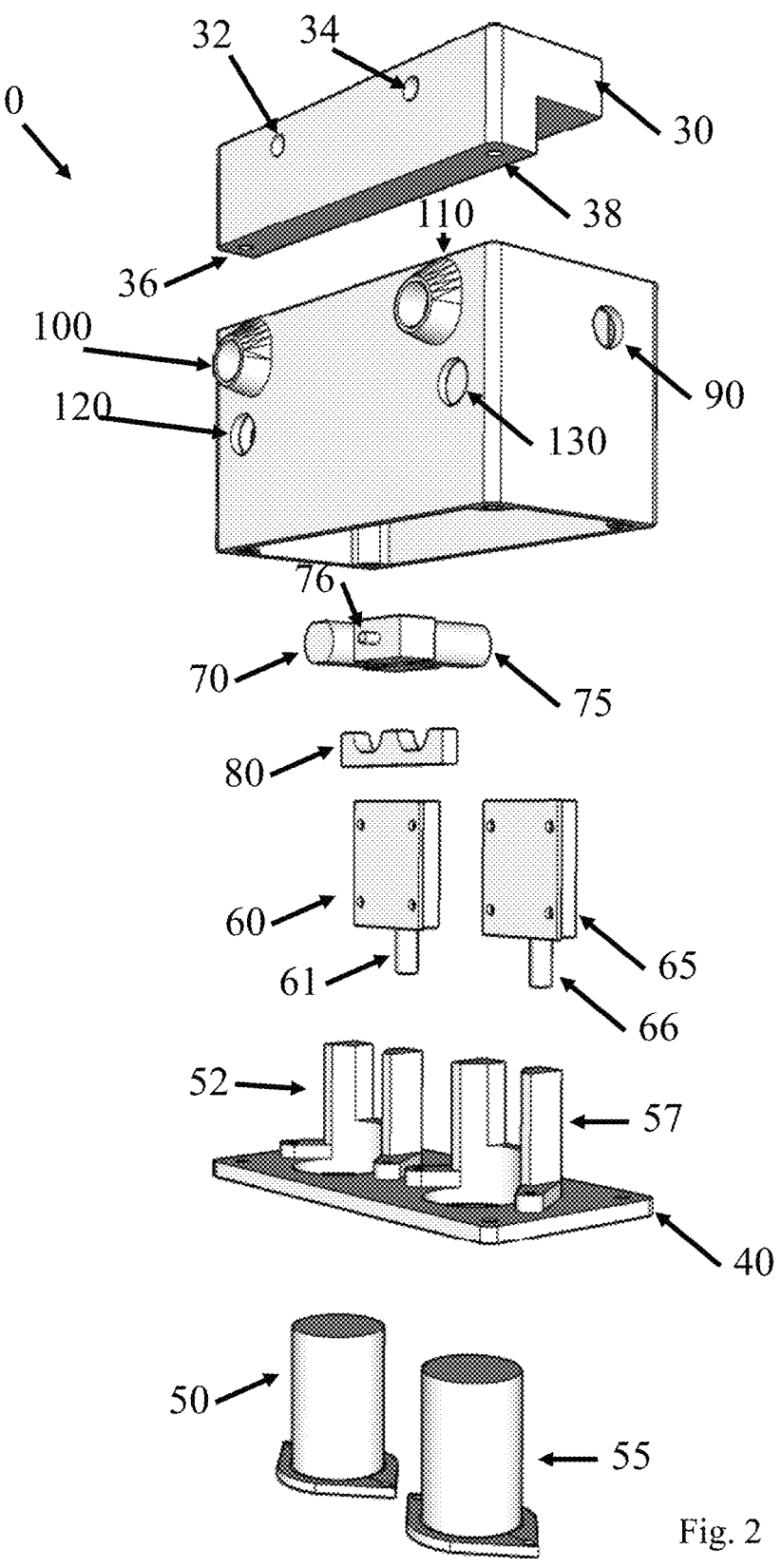
FIG. 2 depicts a vertical exploded view of components of an embodiment of an aquatic acclimation device.

FIG. 2 depicts a vertical exploded view of components of an embodiment of an aquatic acclimation device 10. The elements of FIG. 2 are discussed above with respect to FIG. 1.

Figure 3:
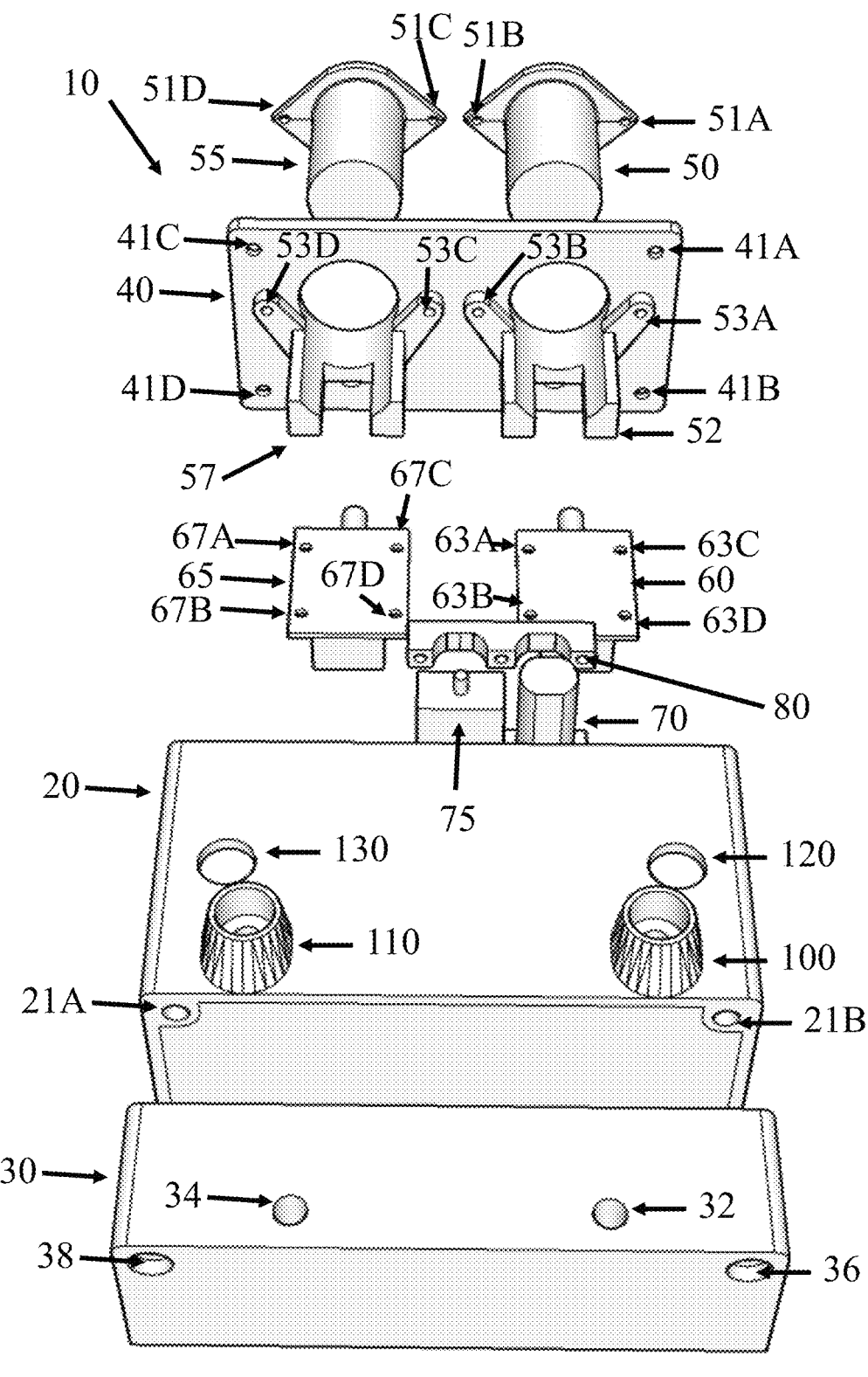
FIG. 3 depicts a rear exploded view of components of an embodiment of an aquatic acclimation device.

FIG. 3 depicts a rear exploded view of components of an embodiment of an aquatic acclimation device 10. The hanger 30 has first 36 and second 38 mounting holes which allow a bolts or screws to pass through the hanger 30 to their corresponding first and second housing mounting holes 21A and 21B respectively on the housing 20. In some embodiments, the longer/shorter the bolts/screws using to connect the hanger 30 to the housing 20, the larger/shorter the gap between the hanger 30 and the housing 20 may be so as to accommodate aquarium or tank walls of varying sizes. The presence of the hanger 30 allows the device to hang on the walls of an aquarium or tank which also facilitates shorter hose/tubing runs and keeps the controls conveniently located.

In some embodiment, an additional spacer may be used between the housing 20 and the hanger 30 to enlarge the gap between them. In some embodiments, there are multiple different sizes of hangers to accommodate varying wall thickness. In some embodiments, a compressible spacer or rubber or foam plate may be used on the lower leg of the hanger 30 (or the back of the housing 20) so as to better secure the device 10 to the wall of the aquarium or tank.

FIG. 3 also provides a better view of the hole in the housing 20 wall each of the nipple protecting bulkheads 100 and 110. The first and second pump motor speed controllers 60 and 65 have mounting holes 63A-D and 67A-D, respectively. The faceplate 40 has mounting holes 41A-C for mounting by way of screws or bolts to the housing 20. The first pump 50 has mounting holes 51A-B for mounting to the face plate 40 at holes 53A-B which also pass through the first pump support 52. The second pump 55 has mounting holes 51C-D for mounting to the face plate 40 at holes 53C-D which also pass through the second pump support 57. In the embodiment of FIG. 3, the pump supports 52 and 57 are integral with the faceplate 40. In some embodiments, the pump supports 52 and 57 are separate from the faceplate 40. Screws and/or bolts are used to mount the pumps 50 and 55 to the faceplate 40.

Figure 4:
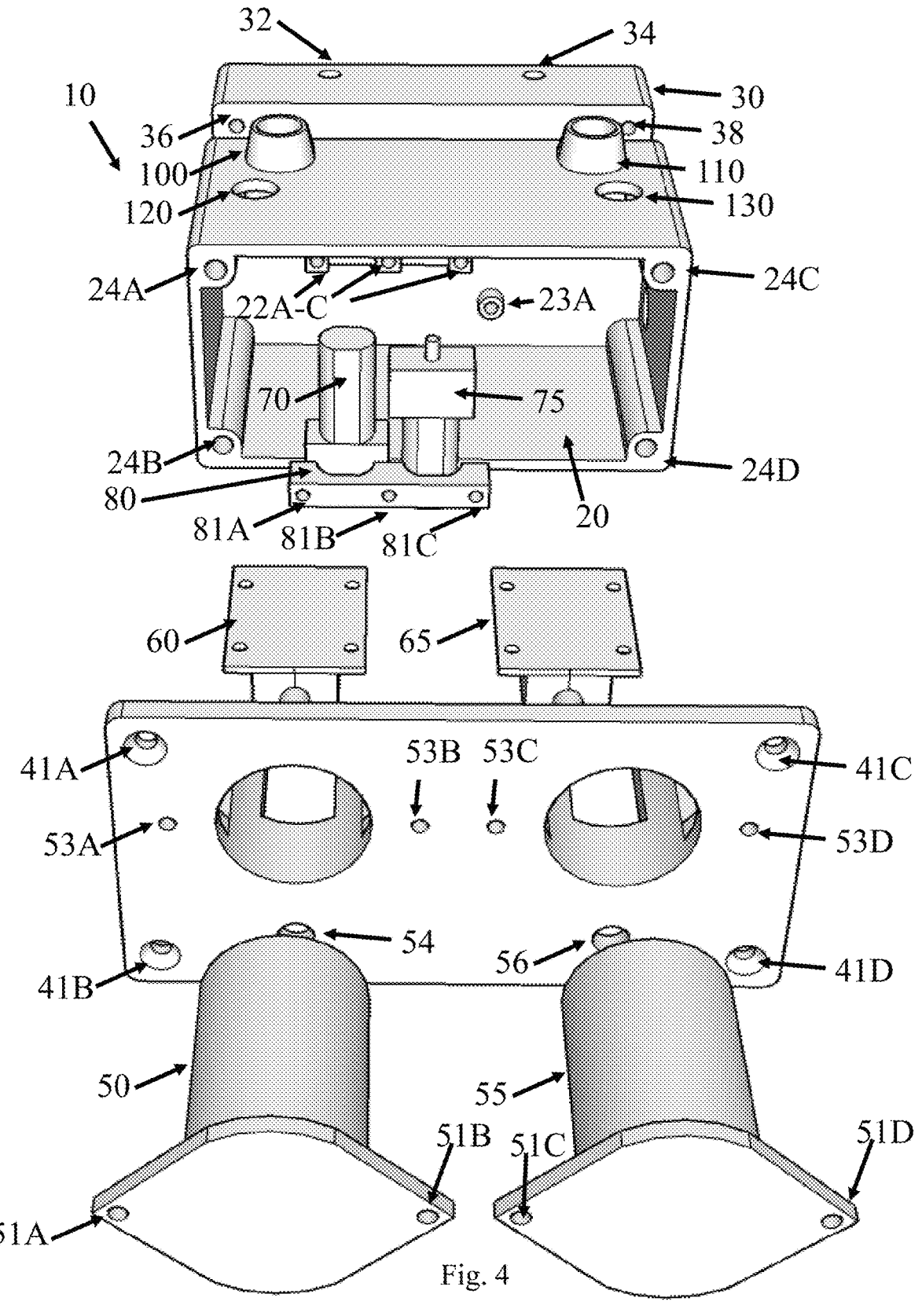
FIG. 4 depicts a front exploded view of components of an embodiment of an aquatic acclimation device.

FIG. 4 depicts a front exploded view of components of an embodiment of an aquatic acclimation device 10. FIG. 4 provides a view of the air pump mounting bracket 80, the bracket having mounting holes 81A-C which allow screws and/or bolts to pass through to corresponding mounting holes 22A-C on the inside of housing 20. A mounting hole 23A is visible for a power converter (not shown). The front face of the hanger 30 is visible, along with the hanger's 30 first 36 and second 38 mounting holes. The mounting holes 51A-D for the pumps 50 and 55 along with their corresponding face plate mounting holes 53A-D are also shown. A hole 54 for the first pump motor controller's shaft 61 and a hole 56 for the second pump motor controller's shaft 66 are also visible.

Figure 5:
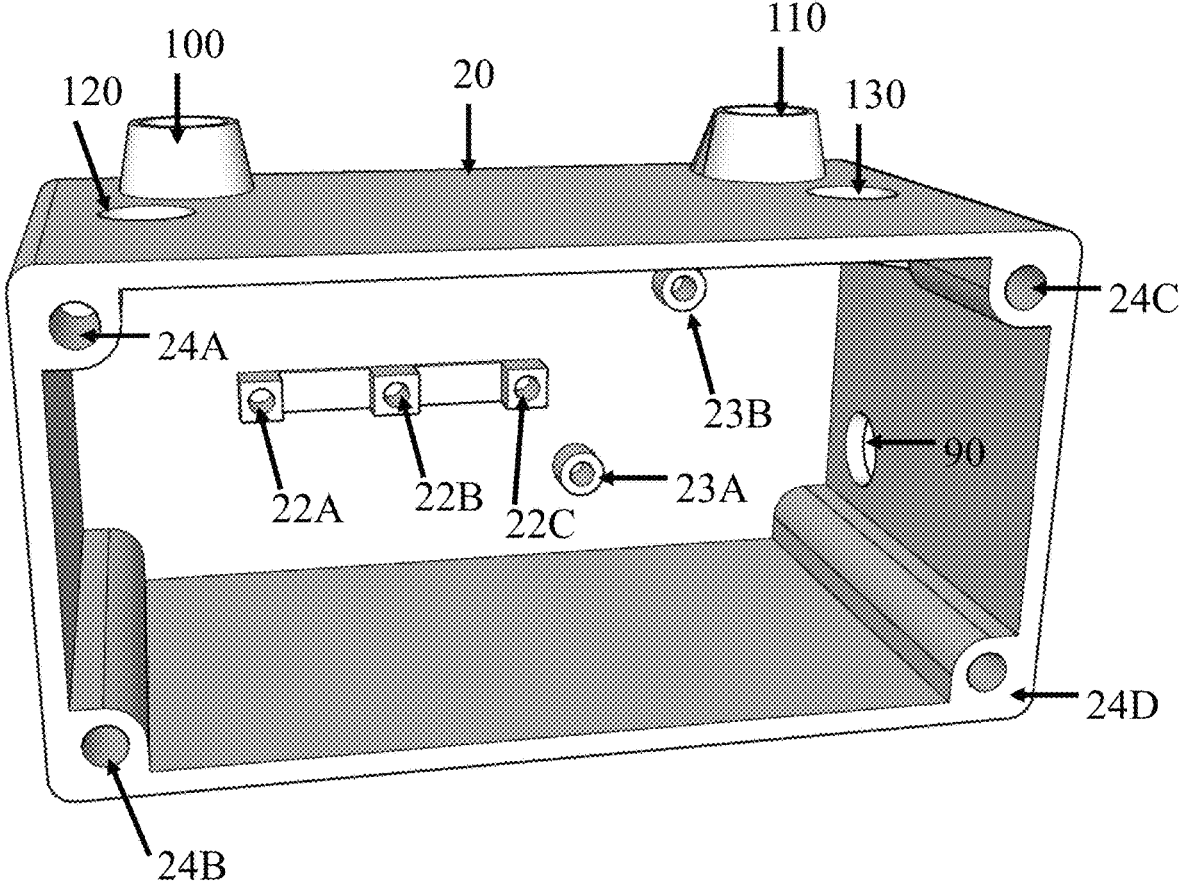
FIG. 5 depicts a front perspective view of a housing of an embodiment of an aquatic acclimation device.
Figure 6:
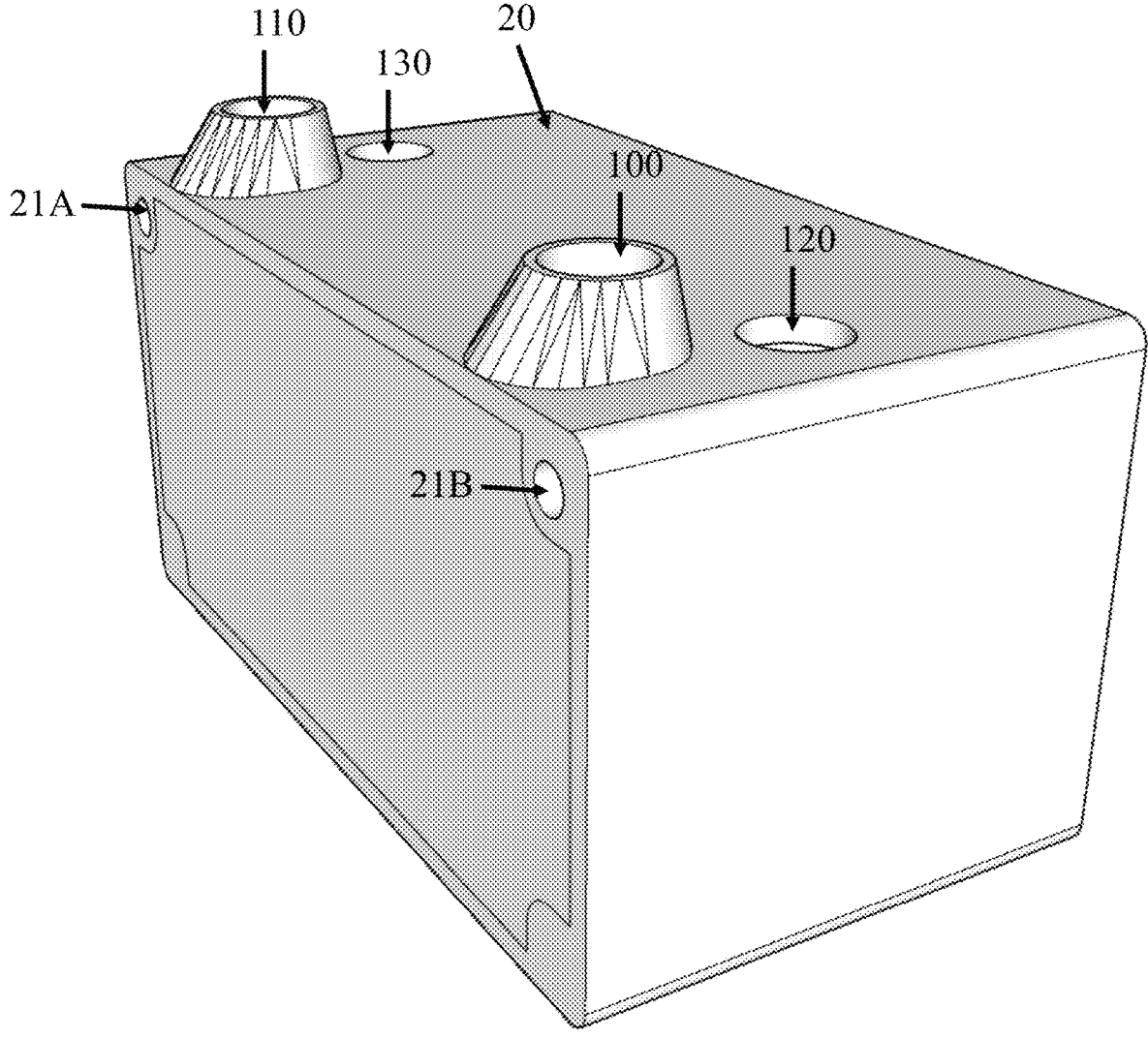
FIG. 6 depicts a side and rear perspective view of a housing of an embodiment of an aquatic acclimation device.
Figure 7:
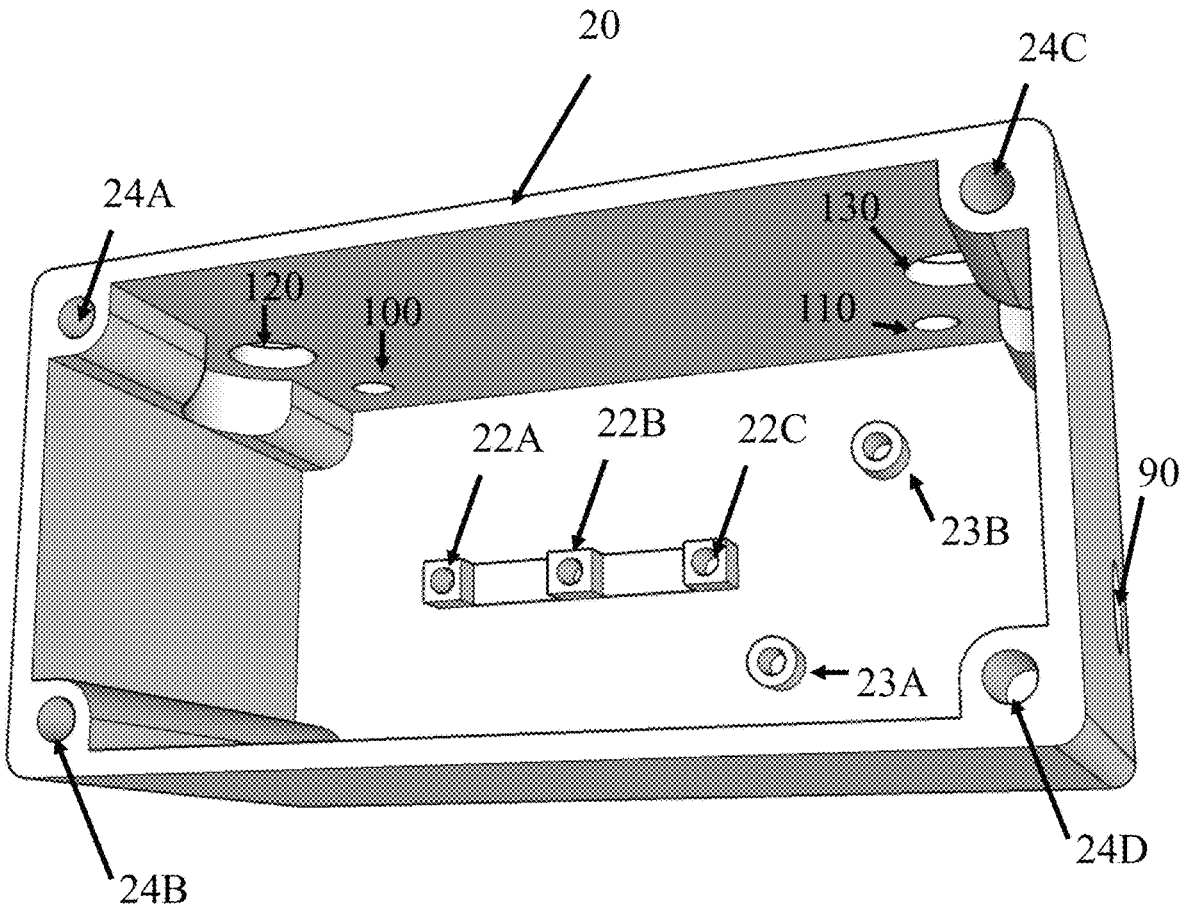
FIG. 7 depicts an internal perspective view of a housing of an embodiment of an aquatic acclimation device.

FIGS. 5-7 depict various views of the housing 20. FIG. 5 depicts a front perspective view of a housing of an embodiment of an aquatic acclimation device. The housing has mounting holes 22A-C for the air pump mounting bracket 80 (not shown). The housing also has mounting holes 23A and 23B for a power converter (not shown). The housing also has mounting holes 24A-D to secure the faceplate 40.

FIG. 6 depicts a side and rear perspective view of a housing of an embodiment of an aquatic acclimation device. The oblong shape of the first and second nipple protecting bulkheads 100 and 110 are shown. The oblong shape depicted is an artifact of 3D printing where additional plastic material is used to strengthen the bulkhead during the printing process and is not necessary for protection of the nipple.

FIG. 7 depicts an internal perspective view of a housing of an embodiment of an aquatic acclimation device. Of note, the openings 100 and 110 appear small as the bulkhead is larger than the opening for the nipple that it protects.

Figure 8:
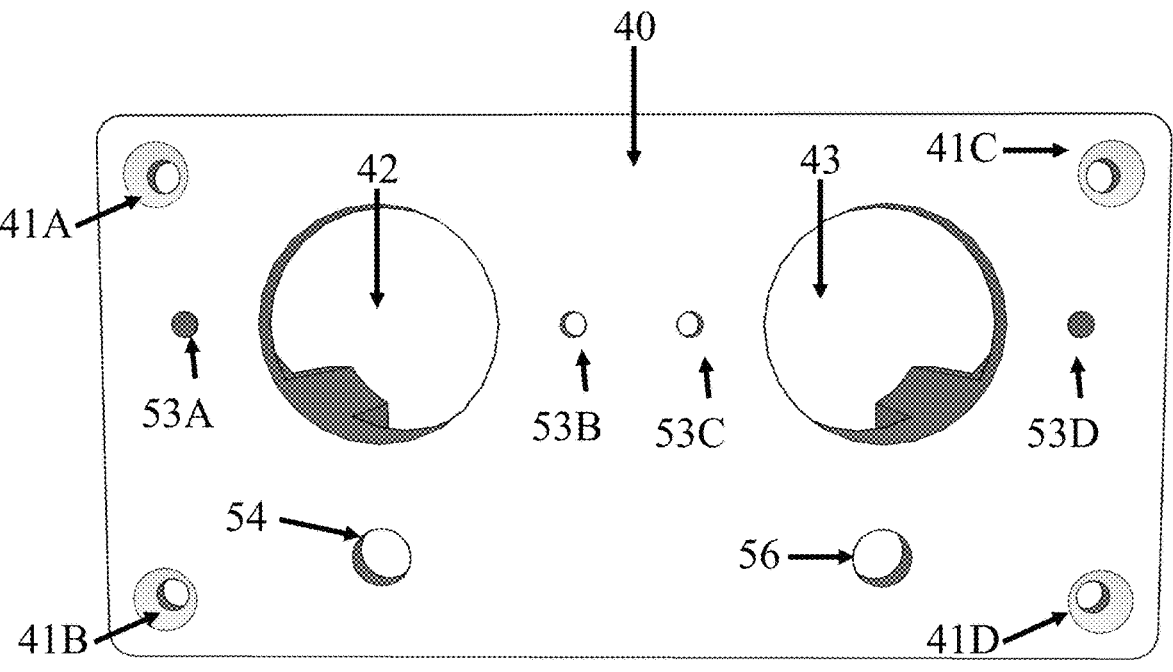
FIG. 8 depicts a front view of a housing faceplate of an embodiment of an aquatic acclimation device.
Figure 9:
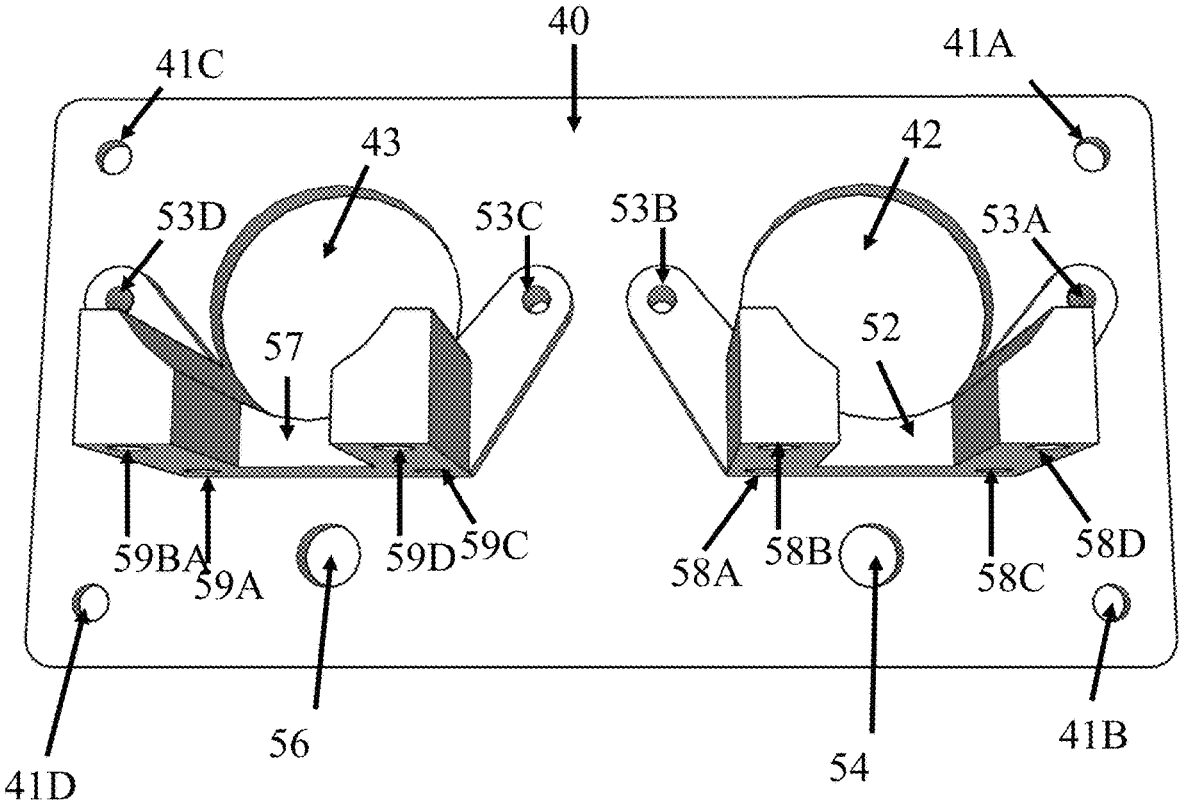
FIG. 9 depicts a rear view of a housing faceplate of an embodiment of an aquatic acclimation device.

FIGS. 8-9 depict various views of the faceplate 40.

FIG. 8 depicts a front view of a housing faceplate of an embodiment of an aquatic acclimation device. In this embodiment, the mounting holes 41A-D for the faceplate 40 are countersunk. The faceplate 40 has shaft openings 54 and 56 below the openings 42 and 43 for the pumps 50 and 55. The faceplate also has pump mounting holes 53A-D.

FIG. 9 depicts a rear view of a housing faceplate of an embodiment of an aquatic acclimation device. The first pump support 52 has mounting holes 58A-D that correspond to the mounting holes 63A-D for the first pump motor speed controller 60. The second pump support 57 has mounting holes 59A-D that correspond to the mounting holes 67A-D for the second pump motor speed controller 65.

Figure 10:
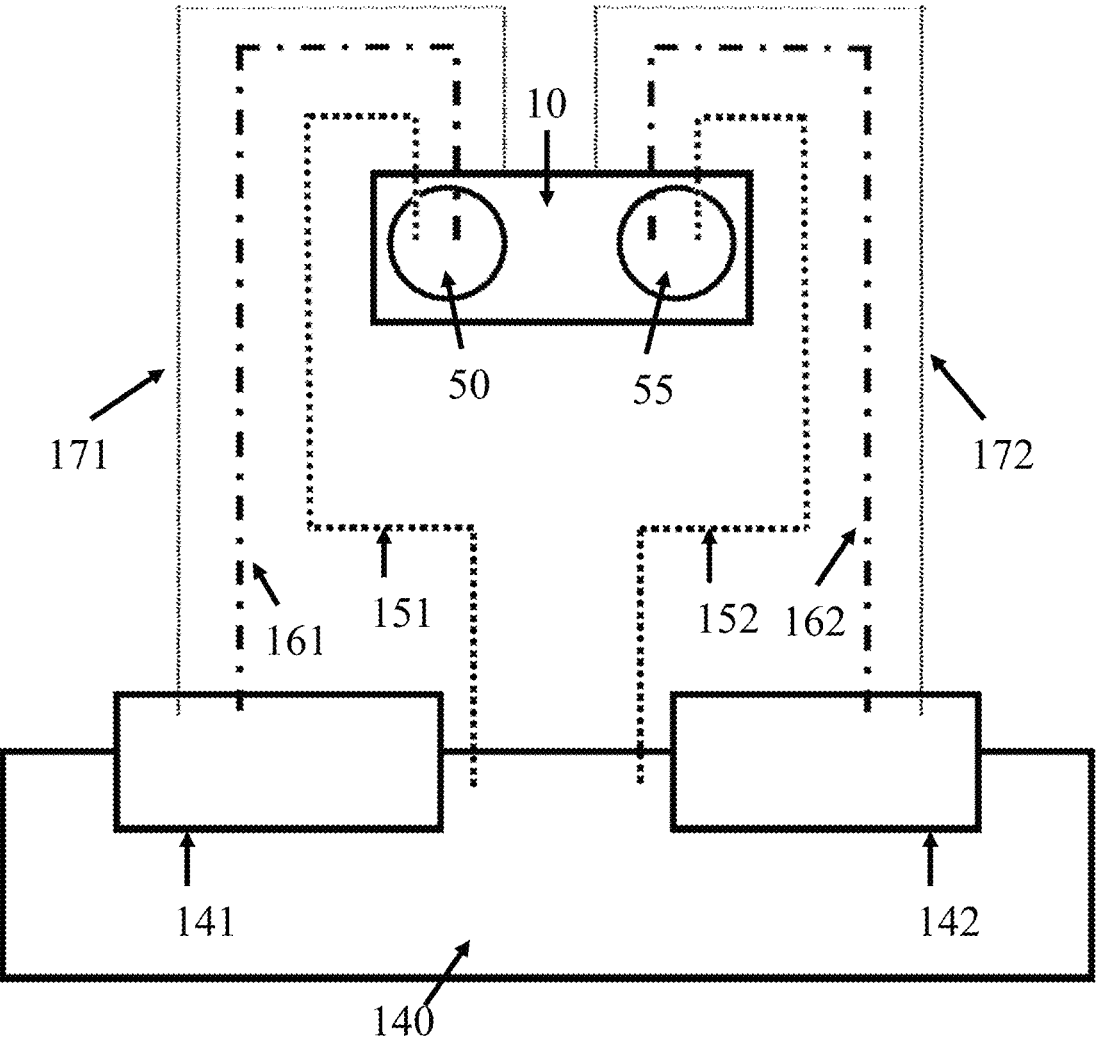
FIG. 10 depicts a plumbing schematic of an embodiment of an aquatic acclimation device.

FIG. 10 is a plumbing schematic of an embodiment of an aquatic acclimation device. The acclimatizer 10 has a first pump 50 and a second pump 55. The first pump 50 has a first suction hose 151 that draws water from the aquarium 140 and discharges the water through a first discharge hose 161 into the first acclimation container 141. The second pump 55 has a second suction hose 152 that draws water from the aquarium 140 and discharges the water through a second discharge hose 162 into the second acclimation container 142. A first aeration hose 171 is used to supply air pumped by acclimatizer 10 to the first acclimation container 141. A second aeration hose 172 is used to supply air pumped by acclimatizer 10 to the second acclimation container 142. The acclimation containers 141 and 142 are, in this example, in contact with the aquarium 140 water.

Figure 11:
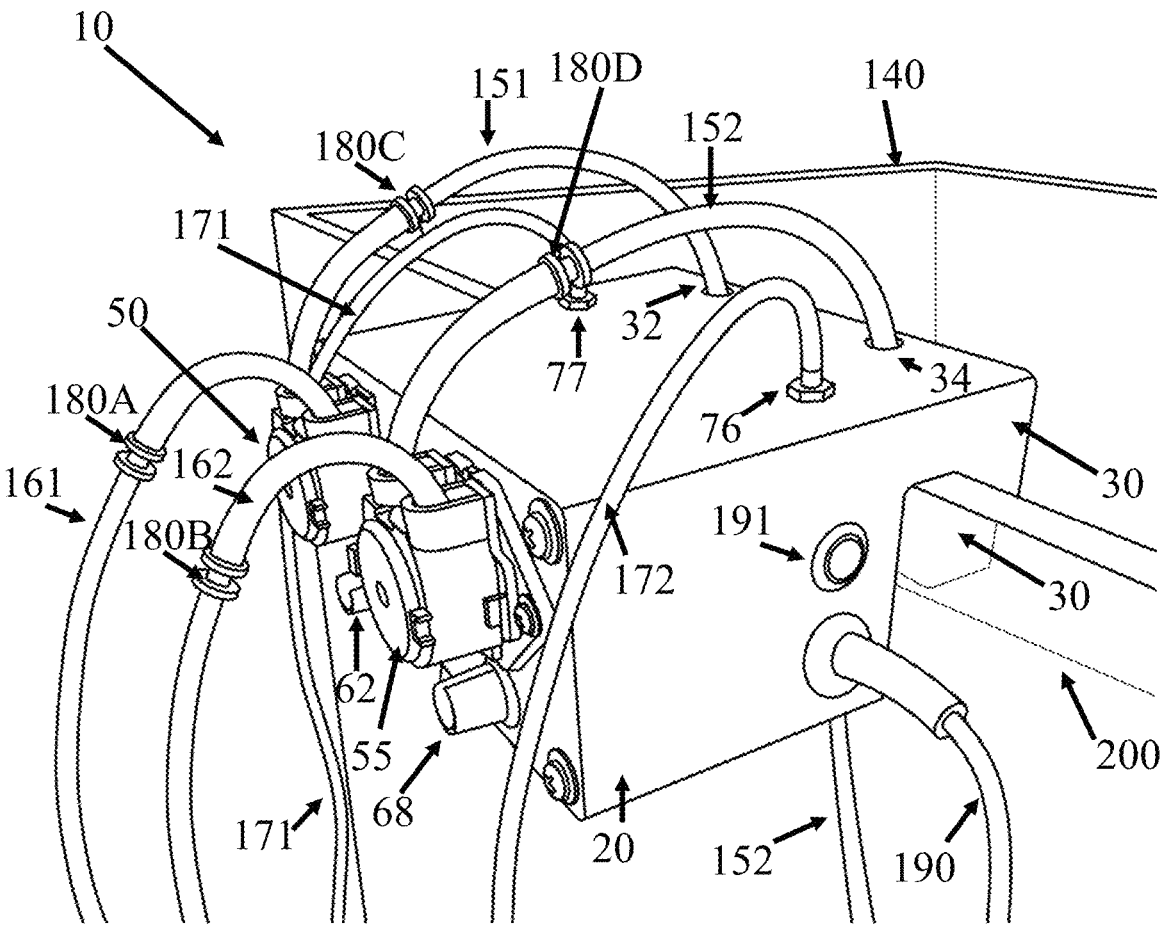
FIG. 11 depicts a perspective view of an embodiment of an aquatic acclimation device with plumbing hoses shown.

FIG. 11 is a perspective view of an embodiment of an aquatic acclimation device with plumbing hoses shown. The acclimatizer 10 has a first water pump 50 and a second water pump 55. The first water pump 50 has a first suction hose 151 secured by a first suction hose guide 32 that draws water from the aquarium 140 and discharges the water through a first discharge hose 161 into the first acclimation container (not shown). A dial 62 for the first motor speed controller is connected to the shaft (not shown) of the first motor speed controller controls the rate of discharge for the first water pump 50.

The second water pump 55 has a second suction hose 152 secured by a second suction hose guide 34 that draws water from the aquarium 140 and discharges the water through a second discharge hose 162 into the second acclimation container (not shown). A dial 68 for the second motor speed controller is connected to the shaft (not shown) of the second motor speed controller controls the rate of discharge for the second water pump 55.

A first aeration hose 171 is connected to the air output nipple 77 for the first air pump. The first aeration hose 171 is used to supply air pumped by acclimatizer 10 to the first acclimation container. A second aeration hose 172 is connected to the air output nipple 76 for the second air pump. The second aeration hose 172 is used to supply air pumped by acclimatizer 10 to the second acclimation container. The nipple protecting bulkheads visible in other figures are not present in this depiction.

The hanger 30 of the acclimatizer 10 is visible, with the aquarium 140 wall contributing to a shift in the hanger's 30 appearance below the wall. Likewise, the water line 200 causes the lower part of the second suction line 152 to appear shifted. Sections of various hoses are joined together by hose connectors 180A-D. A power cord 190 provides electrical power to the acclimatizer 10. In this embodiment, a power switch 191 controls on/off power to the second aeration pump connected to hose 172. A second power switch (not shown) on the opposite side of the housing operates the aeration pump attached to hose 171. Both power switches are preferably located on the top of the housing 20. In some embodiments, a main power switch may also be present.

Figure 12:
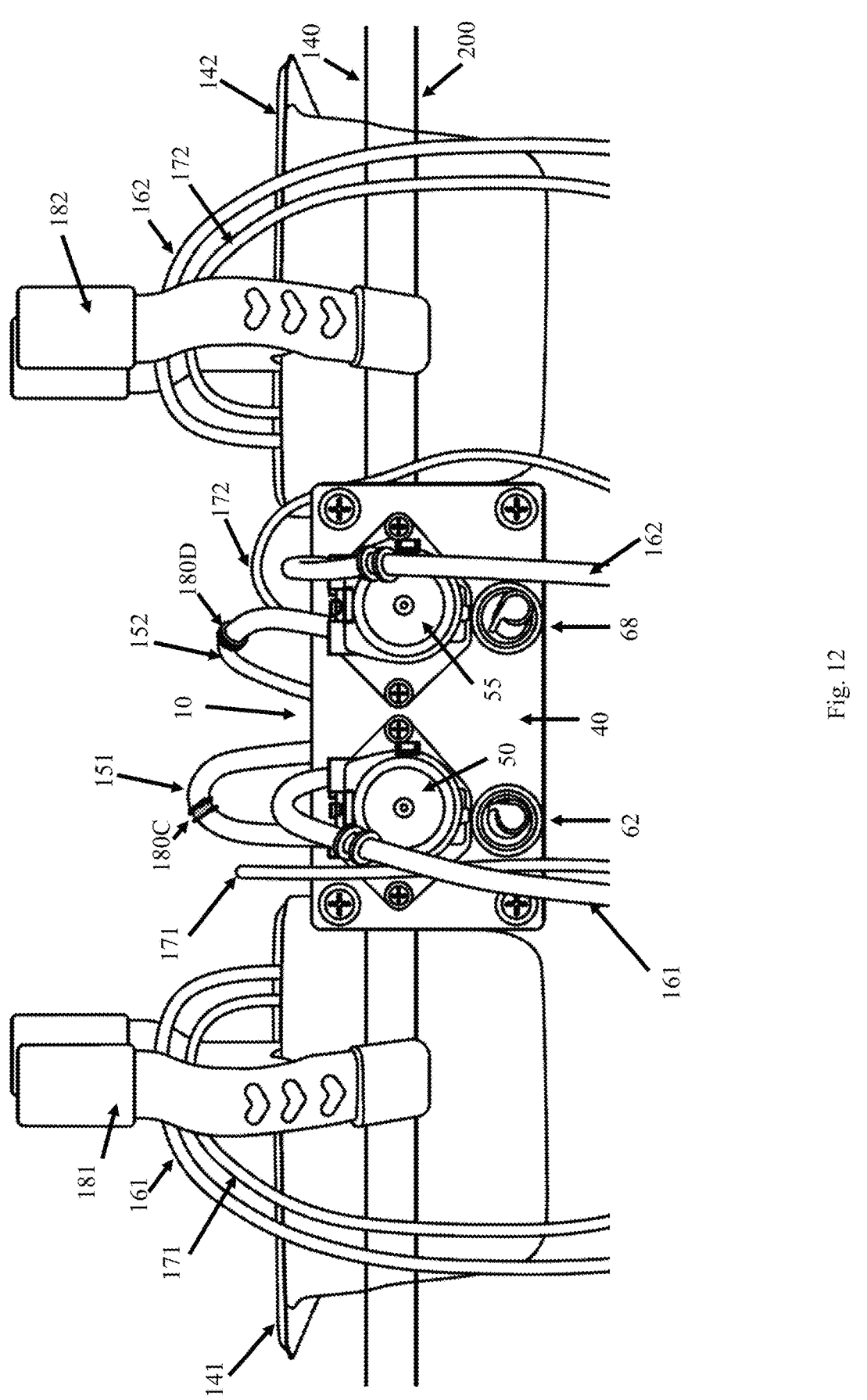
FIG. 12 depicts a front view of an embodiment of an aquatic acclimation device with plumbing hoses and acclimation containers shown.

FIG. 12 is a front view of an embodiment of an aquatic acclimation device with plumbing hoses and acclimation containers shown. The acclimatizer's 10 housing has a faceplate 40 with a first pump 50 and a second water pump 55 mounted thereto. The first pump 50 has a first suction hose 151 draws water from the aquarium 140 and discharges the water through a first discharge hose 161 into the first acclimation container 141. A first clip 181 holds the acclimation container to the side of the aquarium 140 and facilitates keeping the hose 161 from moving via threading of the hose 161 through holes (not shown) in the clip 181 (in some embodiments, the air stone offers sufficient weight to keep hose 171 from easily falling out, in some embodiments, both hoses 161 and 171 may be threaded through holes in the clip). A dial 62 for the first motor speed controller controls the rate of discharge for the first pump 50 as well as on/off power (in this embodiment).

The second water pump 55 has a second suction hose 152 that draws water from the aquarium 140 and discharges the water through a second discharge hose 162 into the second acclimation container 142. A second clip 182 holds the acclimation container to the side of the aquarium 140 and facilitates keeping the hose 162 from moving via threading of the hose 162 through holes (not shown) in the clip 182 (in some embodiments, the air stone offers sufficient weight to keep hose 172 from easily falling out, in some embodiments, both hoses 162 and 172 may be threaded through holes in the clip). A dial 68 for the second motor speed controller controls the rate of discharge for the second water pump 55, as well as on/off power (in this embodiment).

A first aeration hose 171 is connected to the first air pump (not shown). The first aeration hose 171 is used to supply air pumped by acclimatizer 10 to the first acclimation container 141. A second aeration hose 172 is connected to the second air pump (not shown). The second aeration hose 172 is used to supply air pumped by acclimatizer 10 to the second acclimation container 142.

The nipple protecting bulkheads are not present in this depiction.

The two acclimation containers 141 and 142 are, in this example, in contact with the aquarium 140 water and their bottoms rest below the water line 200. In some embodiments, an acclimation container may have a float or optical switch to detect the level of the water in the container and turn of power to the corresponding pump (or entire acclimatizer) if the water level is too high. This avoids water spilling out of the container and on to the surface below and/or into the aquarium.

Figure 13:
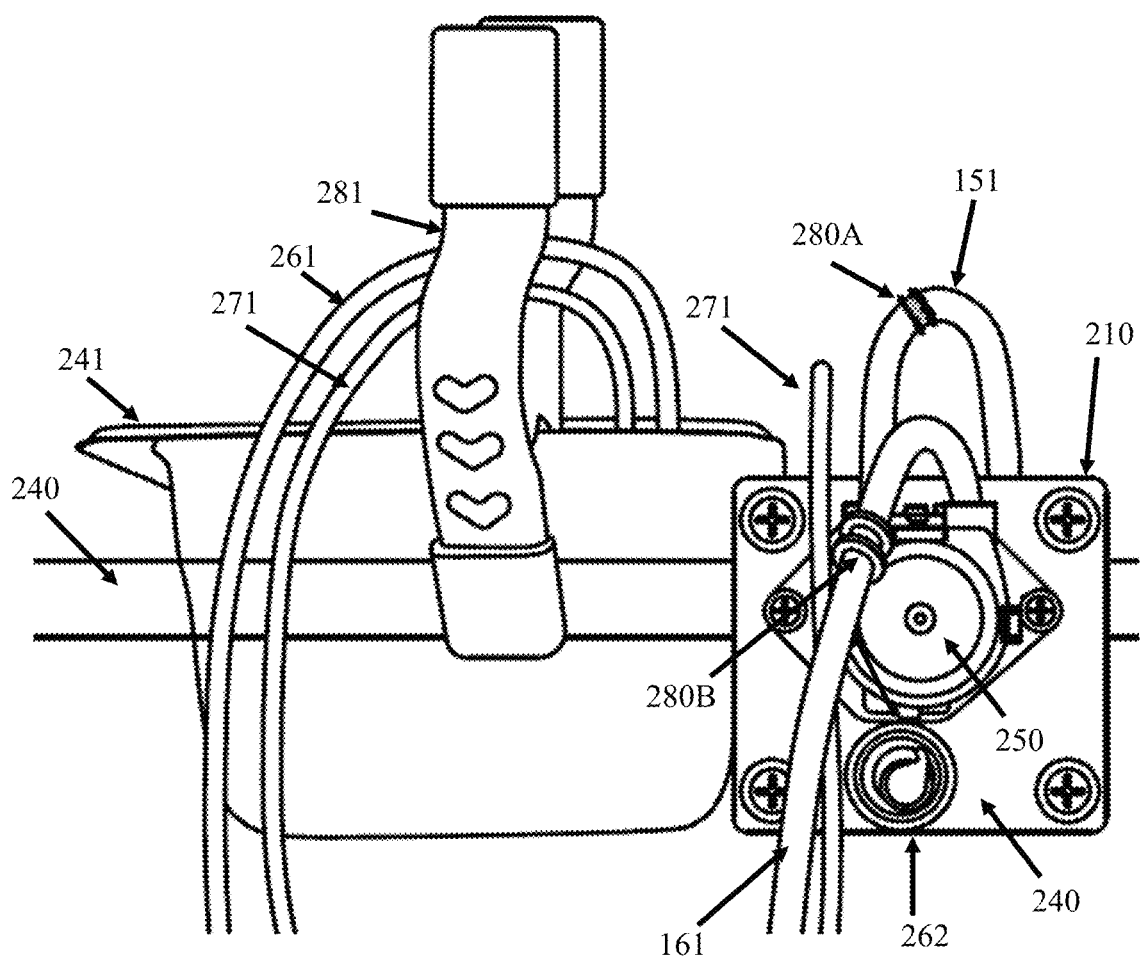
FIG. 13 depicts a single pump head embodiment.

FIG. 13 depicts a single pump head embodiment. In some embodiments, the housing and its internals are very similar to that shown in FIGS. 1-12 and depicted FIG. 13 but that instead of a two side-by-side pumps as shown in FIGS. 1-12, this embodiment in FIG. 13 has a single water pump head, a single air pump, a single water pump motor speed controller, and a hanger with a single suction tube guide. The acclimatizer's 210 housing has a faceplate 240 with a pump head 250 mounted thereto. The pump head 250 has a suction hose 251 draws water from the aquarium 240 and discharges the water through a discharge hose 261 into the acclimation container 241. A clip 281 holds the acclimation container to the side of the aquarium 240 and facilitates keeping the hoses 261 and 271 from moving via threading of the hoses 261 and 271 through holes (not shown) in the clip 281. A dial 262 for the motor speed controller controls the rate of discharge for the pump head 250 as well as on/off power for the pump head 250 (in this embodiment). Sections of various hoses are joined together by hose connectors 280A-B.

In some embodiments similar to FIG. 13, the single pump head is instead a dual-head pump (e.g., two pumps driven by a single pump motor). In such a dual-head pump embodiment, two suction guides may be present in the hanger. Likewise with a dual-head pump embodiment, the housing may have two air pumps. Single pump (and single dual-head pump) units may connect or secure to another unit by way of a magnet placed on a side of the housing. These single-head pump and dual-head pump embodiments are used with the same method as described herein, the method being adapted for a single-head pump or a dual-head pump accordingly.

In a method of using various embodiments of an acclimatizer, an acclimatizer device having one or two but perhaps three to six or more water pumps is provided. Each pump has a source and discharge hose. The acclimation device may have one or two but perhaps three to six or more air pumps. The acclimation device may have an equal number of air and water pumps. Each air pump has a corresponding air hose. Each air hose may have an air stone. The acclimation device in some embodiments comprises a hanger. The hanger may have one or more suction hose guides therein.

Acclimation water (e.g., from an aquarium or a reservoir) is provided. At least one but perhaps two to six or more acclimation containers are provided. At least one but perhaps two to six or more aquatic organisms or groups of aquatic organisms to be acclimatized are provided.

The acclimation device is hung on the wall of an aquarium by using the hanger. Each acclimation container is placed in the aquarium. Each acclimation container is secured to the aquarium wall with a clip. Each suction hose for each pump is routed through a suction hose guide in a hanger of the acclimatizer. Each suction hose is placed in the acclimation water. Each discharge hose is placed threaded through a hole in the clip for the acclimation container that will be discharged into by that hose. Each discharge hose is placed so as to discharge water into its respective acclimation container. Each air hose is placed so as to discharge air into the water of its corresponding acclimation container.

Initial water (e.g., source media that transported an aquatic organism as discussed earlier) for each acclimation container is placed in each acclimation container. One or more of the aquatic organisms to be acclimatized are placed in each acclimation container. For each acclimation container, a water pump for that container is turned on and the rate of discharge is adjusted as desired. When turned on, the water pump will begin to draw water from the acclimation water and discharge the acclimation water into the acclimatization container. For each acclimation container, the air pump for that container is turned on.

Thereafter, the temperature of the water in the acclimatization container will typically change, and many or all of the parameters of the water therein will generally become more closely aligned with the acclimation water's parameters. Once the acclimation container's water parameters and the aquarium's water parameters are sufficiently similar (or alternatively after some desired period of time) the aquatic organism(s) to be acclimated are removed from the acclimation container and placed into the aquarium.

The steps described above are flexible in terms of order and may vary (or not be present at all) depending on various things including the type and number of pumps, the aquarium equipment layout, the aquarium water parameters, the initial water parameters, the hardiness of the aquatic organism, the need for (or risks associated with) aeration, and preferences of the operator. Multiple acclimation devices may be used simultaneously.

In some embodiments, the acclimatizer is modular, with one modular unit having one water pump, one water pump controller, one air pump, one housing, and one hanger. In some embodiments, the modular unit has a dual-head pump with a pump motor speed controller that may control the speed of a single motor for both pumps. In some embodiments, a modular unit may also have a power supply. In some embodiments, a modular unit does not have a power supply and connects with a modular unit with a power supply to get power. In some embodiments, a modular unit may have connections on each side, one to pass power through to another modular unit, and another to receive power from another modular unit. In some embodiments, modular units may join to each other via one or more magnets on the side(s) of the housing that magnetically attract and secure units to each other. In some embodiments, modular units are bolted to each other or snap together.

In some embodiments, a single acclimation container is used and the first water pump provides acclimation/aquarium water to the acclimation container while the second water pump draws water from the acclimation container and discharges it as waste water (e.g., into a waster container or a sewer system). When set up properly, the acclimation container's water level will remain generally constant, neither going dry (i.e., becoming too shallow to support the creatures therein) nor overflowing.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature, or function. While specific embodiments of, and examples for, the invention are described herein for illustrative purposes only, various equivalent modifications are possible within the spirit and scope of the invention, as those skilled in the relevant art will recognize and appreciate. Thus, while the invention has been described herein with reference to particular embodiments thereof, a latitude of modification, various changes, and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", "in some embodiments", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments.

What is claimed is:

1. An aquatic organism acclimation apparatus comprising:
   a housing;
   a hanger connected to the housing;
   a first water pump connected to the housing;
   a second water pump connected to the housing;
   a first motor speed controller to control the flow rate for the first water pump, the first motor speed controller connected to the housing; and
   a second motor speed controller to control the flow rate for the second water pump, the second motor speed controller connected to the housing.

2. The apparatus of claim 1 wherein the hanger comprises exactly one tube guide opening for a tube to pass through.

3. The apparatus of claim 1 wherein the hanger comprises at least two tube guide openings, each opening for a tube to pass through.

4. The apparatus of claim 1 wherein the hanger is L-shaped.

5. The apparatus of claim 1 further comprising:
exactly one air pump inside the housing.

6. The apparatus of claim 1 further comprising:
at least two air pumps inside the housing.

7. An aquatic organism acclimation apparatus comprising:
a housing;
a hanger connected to the housing;
a first dual-head water pump connected to the housing;
a second dual-head water pump connected to the housing;
a first motor speed controller to control the flow rate for the first dual-head water pump, the first motor speed controller connected to the housing; and
a second motor speed controller to control the flow rate for the second dual-head water pump, the second motor speed controller connected to the housing.

8. The apparatus of claim 7 wherein the hanger comprises exactly one tube guide opening for a tube to pass through.

9. The apparatus of claim 7 wherein the hanger comprises at least two tube guide openings, each opening for a tube to pass through.

10. The apparatus of claim 7 wherein the hanger is L-shaped.

11. The apparatus of claim 7 further comprising:
exactly one air pump inside the housing.

12. The apparatus of claim 7 further comprising:
at least two air pumps inside the housing.

* * * * *